(12) United States Patent
Vesma (10) Patent No.: US 11,442,009 B2
(45) Date of Patent: Sep. 13, 2022

(54) FLOW CELL ASSEMBLY INCLUDING A FLUID SWIRL CHAMBER AND ULTRASONIC AGITATION DEVICE

(71) Applicant: XYLEM EUROPE GMBH, Schaffhausen (CH)

(72) Inventor: Valdis Robin Vesma, Wadhurst (GB)

(73) Assignee: XYLEM EUROPE GMBH, Schaffhausen (CH)

(*) Notice: Subject to any disclaimer, the term of this patent is extended or adjusted under 35 U.S.C. 154(b) by 0 days.

(21) Appl. No.: 17/050,762

(22) PCT Filed: Apr. 26, 2019

(86) PCT No.: PCT/EP2019/060758
§ 371 (c)(1),
(2) Date: Oct. 26, 2020

(87) PCT Pub. No.: WO2019/207117
PCT Pub. Date: Oct. 31, 2019

(65) Prior Publication Data
US 2021/0096070 A1    Apr. 1, 2021

(30) Foreign Application Priority Data

Apr. 27, 2018 (EP) ..................... 18169771

(51) Int. Cl.
*G01N 21/41* (2006.01)
*G01N 21/05* (2006.01)
*G01N 21/84* (2006.01)

(52) U.S. Cl.
CPC ......... *G01N 21/4133* (2013.01); *G01N 21/05* (2013.01); *G01N 2021/8405* (2013.01)

(58) Field of Classification Search
CPC ............... G01N 21/4133; G01N 21/05; G01N 2021/8405; G01N 21/15; G01N 2021/8411; B01F 2005/002; B01F 11/0258
See application file for complete search history.

(56) References Cited

U.S. PATENT DOCUMENTS

| | | | |
|---|---|---|---|
| 2008/0141784 | A1 | 6/2008 | Murakami |
| 2011/0032528 | A1 | 2/2011 | Charette |
| 2017/0115225 | A1 | 4/2017 | Sreekumar et al. |

FOREIGN PATENT DOCUMENTS

| | | | |
|---|---|---|---|
| FR | 2864848 | A1 | 7/2005 |
| JP | 2010214754 | A | 9/2010 |
| WO | WO 2014/005986 | A1 | 1/2014 |

OTHER PUBLICATIONS

Radel, Stefan et al., "Ultrasonic Standing Wave Accelerates On-Line Measurement and Prevents Coating of a FTIR ATR Flow Cell", Jan. 2004, Vienna University of Technology, Proceedings of IEEE Sensors 2004 Conference, pp. 757-759.

(Continued)

*Primary Examiner* — Hwa Andrew Lee
(74) *Attorney, Agent, or Firm* — Flaster Greenberg, P.C.

(57) ABSTRACT

A flow cell for use with an analytical device having a measurement surface onto which a fluid sample to be measured can be received comprises: a housing comprising an interface for connecting to an analytical device; a fluid chamber provided in the housing, the fluid chamber comprising sidewalls at least partly defining an internal volume for receiving a multiphase fluid sample and an opening arranged so as to provide a multiphase fluid sample received in the internal chamber volume to a measurement surface of an analytical device when the housing is connected to the analytical device; and an agitation device. The agitation device comprises an agitation mechanism adapted to agitate (Continued)

a multiphase fluid sample within the internal volume of the fluid chamber and cause movement of the fluid through and within the opening thereby providing fluid to a measurement surface of an analytical device. The agitation mechanism is separated from the internal volume by a barrier wall.

16 Claims, 6 Drawing Sheets

(56) References Cited

OTHER PUBLICATIONS

Appendix to the Instructions Manual PR-23 for K-Patents Products Intended for Use in Pharmaceuticals Industry, Dec. 15, 2011.

FLOW CELL ASSEMBLY INCLUDING A FLUID SWIRL CHAMBER AND ULTRASONIC AGITATION DEVICE

CROSS-REFERENCE TO RELATED APPLICATIONS

This application is a national stage application, filed under 35 U.S.C. § 371, of International Patent Application No. PCT/EP2019/060758, filed on Apr. 26, 2019, which claims priority to European Provisional Application No. 18169771.5, filed on Apr. 27, 2018, which are incorporated by reference herein in their entireties.

FIELD

This disclosure relates to a flow cell, an assembly for measuring a property of a multiphase fluid sample and a method for measuring a property of a multiphase fluid sample.

BACKGROUND

Analytical devices are used to measure properties of materials to ensure that the materials have a particular composition or property. Some analytical devices have measurement surfaces onto which samples are placed in order to be measured. This typically requires the sample to be in a particular phase (e.g. solid or liquid) and to be homogeneous to ensure that a reading can be taken to ensure that the reading is accurate and representative of the whole sample. This can be particularly difficult where the sample is a multiphase fluid (e.g. a fluid that comprises more than phase) and can revert back to a state in which the individual components (or groups of components) are separated or not distributed evenly, as this can impede measurement.

Optical measurements using optical analytical devices, which are often relied on as part of quality control systems in manufacturing processes, are particularly prone to this problem with multiphase fluids. These problems can slow down production processes and increase costs. For example, in many drinks production processes (e.g. production of fruit juices from concentrate, coffee and carbonated beverages) batches must be tested using refractometers and other optical measurement devices to ensure that the multiphase fluids have enough of each component and are at the desired concentrations. In the case of many multiphase fluids, such as fruit juices from concentrate, there are minimum requirements for an amount of a particularly component and inaccurate readings lead to the need to include excess of a particular component, which is often costly, particularly in large volumes. In the case of fruit juices from concentrate, this is particularly true as optical measurements are impeded by particulates and oils in the fluid, resulting in readings that can be inaccurate and potential contamination issues, requiring additional cleaning. In cases where accuracy is essential, for example in the production of pharmaceutical compositions or components for use in pharmaceutical products, measurements may need to be repeated, which is costly, particularly in continuous flow processes.

Flow cells which comprise a chamber for fluid and which can be attached to a refractometer are known. In these systems, fluid can be pumped into the flow cell by an external pump, where a refractive index reading can be taken. However, these systems do not effectively keep multiphase fluids in a homogenous or well-mixed state while they are in the flow cell the flow cell is prone to contamination, particularly where the multiphase fluids include oils and settling particulates. This is particularly the case in parts of the flow cell where fluid does not flow freely, for example around corners and surfaces where fluid flow is stalled. These existing designs are also not suitable for a number of multiphase fluids, such as carbonated fluids and are typically expensive due to the use of external pumping equipment. Therefore, it is an object of the disclosure to address the aforementioned problems.

SUMMARY

In a first aspect, there is provided a flow cell for use with an analytical device having a measurement surface onto which a fluid sample to be measured can be received. The flow cell comprises a housing comprising an interface for connecting to an analytical device; a fluid chamber provided in the housing, the fluid chamber comprising sidewalls at least partly defining an internal volume for receiving a multiphase fluid sample and an opening arranged so as to provide a multiphase fluid sample received in the internal chamber volume to a measurement surface of an analytical device when the housing is connected to the analytical device; and an agitation device. The agitation device comprises an agitation mechanism adapted to agitate a multiphase fluid sample within the internal volume of the fluid chamber and cause movement of the fluid through and within the opening thereby providing fluid to a measurement surface of an analytical device. The agitation mechanism is separated from the internal volume by a barrier wall.

Embodiments therefore provide a flow cell (in other words a fluid sample receiving cell or device) which is adapted for use with an analytical device or sample measurement device, which analytical device has a surface onto which a fluid is received and on which surface the measurement a conducted. Embodiments of the flow cell can thus can act as an addition to or attachment for an analytical device and can thus advantageously be retrofitted to existing analytical devices. The flow cell comprises a main body or housing which can have a connection or attachment means for interfacing with the analytical device, thereby allowing the flow cell and analytical device to interconnect and act as a single unit. The interface in some embodiments can be a surface or could include an attachment element for holding the elements in place. The flow cell also comprises a fluid chamber having sidewalls, an inner volume or cavity defined at least partly by the sidewalls (other elements may be present which partly define the inner volume, for example an upper wall (ceiling) or part of the barrier wall) and an opening which can extend through the sidewalls (and in some embodiments, the housing) for fluidly connecting the chamber to an external measurement surface (thus the opening may terminate on an outside wall or surface). The main body or housing also includes an opening or aperture which is fluidly connected to the inner volume of the chamber (and thus can be considered to be part of the chamber) and, when the flow cell is connected to an analytical device by virtue of the interface, aligns with the measurement surface of the analytical device so that there is a fluid connection between the measurement surface and the fluid chamber. The flow cell also includes at least one (in some embodiments, a plurality e.g. 2, 3 or more) agitation or mixing device or means which can be located in the housing (partially or entirely) and which comprises an agitation/mixing mechanism, means or element. The agitation mechanism is located and arranged so that it can agitate or stir a multiphase fluid (or indeed any fluid) contained within the fluid chamber so that the fluid can be caused to flow within or around the chamber and across or over the surface, through the opening, thereby allowing the fluid to be measured by the analytical device. In other words, the agitation mechanism acts can provide a pumping action which causes flow of the fluid within the chamber including the opening, thereby mixing the multiphase fluid and improving the homogeneity or intermixing of the components of the fluid. The flow cell also includes a barrier wall or cover which separates the agitation mechanism from the inner volume, thereby protecting the mechanism from the multiphase fluid and reducing the risk of contamination due to interaction with components of the agitation mechanism.

Embodiments therefore provide a device that can be used to accurately measure properties of multiphase fluids. By providing an agitation device having an agitation mechanism that is arranged to move or flow the fluid within the chamber and through the opening so that the fluid travels across a measurement surface, this ensures that the multiphase fluid remains homogenous, where miscible, or well-mixed (e.g. components remains intermixed or suspended in solution) while the measurement is carried out thereby allowing for a precise measurement of the fluid's properties. In particular, arranging the agitation device to agitate the fluid contained in the chamber ensures that all the fluid in the chamber can be kept moving (i.e. kept in motion) and reduces the likelihood of any regions of stationary fluid which are prone to build up of fluid. This also reduces the risk of contamination as components of the multiphase fluid are much less likely to coat the inner surfaces (e.g. sidewalls) of the fluid chamber and the measurement surface. In turn, this also reduces or eliminates the need for cleaning, which is particularly advantageous, particularly over prior art systems where fluid is pumped by an external pump through the cell, but no direct action on the fluid within the cell is carried out.

For example, in the case of optical analytical devices (e.g. a refractometer), these are designed to measure pure solutions (solute with totally dissolved components); however, when the solute contains undissolved components (e.g. solids), the presence of these components can adversely affect the ability of the optical analytical device to measure the solute. This can include non-settling particulates coating surfaces through the effects of contact, adhesion or static charge; settling particulates covering or masking the measuring surface; or oils (e.g. in an emulsion) coming out of solution and coating surfaces. An example multiphase solution is fruit juice, which can contain essential oils and pulp components. Thus, the flow cell arrangement helps to reduce the risk of the essential oils (which are often coloured and viscous and thus can interfere dramatically with measurements, particularly optical measurement such as refractive index) and pulp components coating the measurement surface and other parts of the flow cell. In the case of carbonated beverages, this can also be used to remove gasses.

Moreover, any increased risk of contamination or damage as a result of the agitation mechanism acting on the fluid within the chamber is prevented by the use of a barrier wall. This barrier wall thus separates the mechanism (particularly any moving parts and/or intricate parts of the mechanism) which would otherwise be particularly prone to contamination. In this way, the inner volume can be free of the moving parts of the agitation mechanism or parts that are prone to damage.

In view of the above advantages, embodiments provide flow cells which can be used to speed up measurements, thereby reducing processing times and thus costs. The flow cells also provide more accurate measurements than existing devices, which in some cases can in turn result in reduced costs, for example where minimum levels of particular compounds are required.

By multiphase fluid (or multicomponent fluid) it is meant a fluid that comprises more than one phase, which can include different physical states (for example a liquid comprising a solid or a gas) or components with the same physical state but which are at least partly immiscible (e.g. an emulsion, such as oil in water). In some embodiments, the multiphase fluid is a liquid comprising multiple liquid phases (e.g. an emulsion, such as oil in water) or comprising a solid or gas. Thus, in some embodiments the flow cell is for use with an analytical device in measuring a property, such as an optical property, of a multiphase fluid selected from a solid-containing liquid (e.g. settling solid particulates (a suspension) or non-settling particulars (colloid)), a mixture of at least two immiscible liquids, or a gas-containing liquid (both dissolved and undissolved gases). For example, the multiphase fluid can include a carbonated liquid, a coffee-containing liquid or a fruit juice fluid sample.

The barrier wall or layer serves to separate fluid received within the fluid chamber from the agitation mechanism. Thus all moving or functional parts of the agitation device can be separated from the inner volume of the fluid chamber by the barrier wall or layer. The barrier wall is therefore fluid impermeable, but can in some embodiments allow passage of the mixing force therethrough. Thus, the agitation mechanism, and in some embodiments the agitation device, can be adjacent the fluid chamber but separated from (external to) the internal volume by a barrier wall. In some embodiments, the barrier layer is a sidewall of the fluid chamber. Thus, the agitation mechanism can be adapted to agitate fluid within the inner volume of the fluid chamber through a sidewall of the fluid chamber. In some embodiments, the agitation device comprises a cover and the cover defines the barrier wall. In other words, the agitation device has a cover or housing part which separates the agitation mechanism from the inner volume of the fluid chamber. Thus, the barrier wall may be part of the agitation device. This may be in addition to or instead of a sidewall.

In embodiments where the agitation device comprises a cover and the cover defines the barrier wall, the cover may at least partly define the fluid chamber. In other words, the cover may continuous (i.e. form a fluid seal) with a sidewall of the fluid chamber so as to at least partly delimit or define the inner volume of the fluid chamber. In some embodiments, this is advantageous as this allows the agitation device to act directly on fluid within the fluid chamber without interference from the sidewalls (e.g. a loss of energy). In some embodiments, the barrier wall can also be shaped and/or positioned so as to avoid interfering with the flow of fluid around the chamber. For example, where the fluid chamber is a swirl chamber, circular chamber, spherical chamber or conical chamber, the cover may be continuous with the sidewalls so as to define the shape of the chamber (i.e. not interrupt the shape). In one embodiment, a sidewall or other wall (e.g. top or bottom wall) of the fluid chamber comprises an aperture and the agitation device is positioned in or through the aperture. Thus, the agitation device can readily access the chamber and be removed therefrom, for example, in the case of maintenance.

In an embodiment, the sidewalls of the fluid chamber are arranged to direct multiphase fluid contained in the internal volume towards the opening. This can encourage flow across a measurement surface and can reduce the amount of fluid sample required in the chamber.

The agitation device is arranged to act directly on the fluid contained within the fluid chamber. In other words, the agitation device is arranged to provide a force directly to or act directly on the fluid in the chamber. Alternatively, the agitation device may be arranged to act on the fluid chamber, for example, which in turn acts on the fluid contained therein. For example, the device may vibrate the fluid chamber, thereby vibrating the fluid therein. In some embodiments, the agitation device may be located adjacent to the opening of the fluid chamber. In this way, the agitation device can agitate fluid within the chamber (including the opening) as well as fluid located on the measurement surface. Where the agitation device provides a directional force, the agitation device may further be arranged to direct the force towards the opening and thus towards the measurement surface.

In one embodiment, the agitation device comprises a device adapted to agitate a multiphase fluid sample using sound-waves. In other words, the agitation device is a sonic mixer and thus can agitate the fluid using acoustic waves. The use of such devices is particularly advantageous as these provide an agitation means that can directly on the fluid within the fluid chamber and which can efficiently and effectively agitate the fluid. These can also advantageously be used as directional agitation devices (i.e. devices which provide a force which acts in a particular direction) to create a directional flow within the fluid. A directional force can include a force that primarily travels in a single direction, for example along a single axis, or more generally a force that is not equally dispersed in all directions. For example, such a force may cause fluid to flow in a particular direction.

In one embodiment, the agitation device comprises an ultrasonic sound-wave generator. Thus, the agitation device in some embodiments is an ultrasonic agitator or probe and the agitation mechanism comprises an ultrasonic transducer, for example a piezoelectric transducer or a capacitive transducer. This is particularly advantageous, as this is able to keep the fluid in a homogenous or well-mixed form and provide an effective way of moving the fluid within the chamber. In particular, they can provide a better flow profile than that of conventional impeller or paddle-based mixing as less sample may be required to generate flow, the mixing is more effective and more turbulence can be generated while still providing a directional flow. This is at least in because an ultrasonic agitation device is able to provide a directional force (for example, through the use of a sound-focusing or sound-damping housing) which can create movement in the fluid without direct contact with the fluid. Second, the application of ultrasonic waves can cause cavitation of the fluid, which produces significant agitation beyond simply that provided by fluid flow. This also reduces the likelihood of adherence of components or phases of the multiphase fluid to the components of the flow cell and/or analytical device, particularly since the cavitation can reach areas where flow using traditional mixers would otherwise fail to provide adequate mixing. Thus, in some embodiments, cavitation may be present. This can be introduced, for example by increasing the power provided to or available at the ultrasonic probe and hence the level of vibration. In another embodiment, the ultrasonic agitation device(s) (and/ or the control means or unit) may be adapted to avoid cavitation of the fluid, for example by reducing the power. This can avoid potential issues with accuracy of measurement. For example, cavitation can be used in an initial mixing step, and then the power reduced to avoid cavitation during the actual step of measurement. Moreover, compared to conventional mixers, no direct contact is required thereby reducing the risk of contamination. By ultrasonic it is meant that the device generates high-frequency sound-waves which cause vibrations in a fluid, particularly in a liquid. For example, sound-waves with a frequency of greater than 18 kHz, optionally 20-400 kHz and further optionally 40-80 kHz. In an embodiment, the ultrasonic device comprises an ultrasonic transducer or ultrasonic generation mechanism. The transducer or generation mechanism can be partially enclosed in a housing containing sound-damping material, with the housing and sound damping material having an opening therethrough allowing passage of the ultrasonic waves out of the housing in a particular direction. The opening may be covered by a cover which acts as a window for the sound waves (i.e. it permits the passage of the ultrasonic sound waves). The cover can thus act as a barrier wall, or part of a barrier wall. Typically, the cover is formed from a material resistive to the erosive effects of ultrasonic energy. This can be, but is not exclusively, formed from a glass or metal material. The ultrasonic transducer or ultrasonic generation mechanism may comprise a piezoelectric element (e.g. an element formed of a piezoelectric crystal) and electrodes connected to a power source and a controller.

In some embodiments, the flow coil comprises a plurality of agitation devices. This can be particularly advantageous where these act in combination to provide agitation. For example, the plurality of agitation devices (e.g. first and second agitation device) can be arranged to work in phase. This can produce a complimentary pumping or mixing action. Alternatively, the agitation devices can be adapted to direct fluid in opposing directions. For example, this can be used to create an oscillating movement between the agitation devices. This is particularly advantageous when the agitation devices are sound-generating agitation devices, and particularly ultrasonic agitation devices. For example, two ultrasonic agitation devices can work in phase to produce positive, pressure waves in the same direction (e.g. around a fluid chamber). in another embodiment, the two ultrasonic agitation devices may be out of phase (anti-phase) and thus the force from one can be used to redirect flow caused by the other. For example, a high pressure wave from one can counter a lower pressure wave from the other (for example, by having the devices a particular distance apart).

In an embodiment, the fluid chamber is a flow or swirl (i.e. a vortex or cyclone) chamber having a central axis; and wherein the agitation device is adapted to cause a multiphase fluid sample to flow around the central axis of the swirl chamber. By swirl, vortex or cyclone chamber it is meant that the cell is configured so that fluid flows around chamber in a substantially circular motion. For example, the chamber can have a central axis and sidewalls which form a continuous surface extending around the axis, usually with the sidewalls having a concave shape around the axis. Examples of such chambers include chambers with a cylindrical, vesica piscis prism, spherical or conical (e.g. frustoconical) shape in which the sidewalls are curved and which extend around the central axis. The sidewalls in swirl, vortex or cyclone chambers are arranged so that flowing fluid is guided around the axis by the sidewalls. The chamber can also have an inlet or agitation mechanism arranged so as to cause the fluid to flow around the walls (for example by providing a flow in a tangential direction) thereby causing the vortex or swirl to generate. In this case, depending on the location of the measurement surface, the opening may be provided in the sidewalls or, in some embodiments, may be provided on the central axis and at the bottom of the chamber with the chamber being arranged to direct the fluid flow around the central axis and over the measurement surface. For example, where the chamber has a frustoconical or conical shape with the opening located on a lower surface on and around the central axis and with the taper of the frustoconical or conical shape tapering towards the opening These embodiments in which a swirl, vortex or cyclone chamber is provided are particularly advantageous as the agitation device can be used to flow fluid continuously around the chamber without the need for a large amount of sample (e.g. a continuous flow of sample into the chamber). Moreover, such an arrangement provides minimal points of low or no flow (e.g. corners, crevices etc.) in which contamination could occur.

In a further embodiment, the agitation mechanism is adapted to provide a directional force on the multiphase fluid sample so as to cause the multiphase fluid sample to flow around the swirl, vortex or cyclone chamber, the directional force being in a direction that is tangential to the central axis of the swirl, vortex or cyclone chamber. By providing the force in a tangential direction, this causes a flow of fluid around the chamber. The agitation device thus acts essentially acts as a pumping member which provides a fluid pumping action within the chamber. In the case of sound-generating agitators, particularly an ultrasonic agitation device, this is particularly advantageous as not only will a directional flow cause the fluid to flow around the chamber, but there were also be additional turbulence caused by the vibrations/sound waves, which improves the homogeneity of the multiphase fluid. In a further embodiment, the flow cell may further comprise a second agitation device comprising an agitation mechanism, wherein the agitation mechanisms of the first and second agitation devices are arranged so as to cause the multiphase fluid sample to flow around the central axis of the swirl chamber. In a further embodiment, the agitation mechanisms of the first and second agitation devices are each adapted to provide a directional force on the multiphase fluid sample so as to cause the multiphase fluid sample to flow around the central axis of swirl chamber, the directional force being in a direction that is tangential to the swirl chamber. Thus, the first and second agitation devices may be located around the chamber to provide tangential directional forces which act on the fluid in the same direction (i.e. the same direction around the circumference of the fluid chamber). Thus, a more powerful consistent flow around the chamber can be produced.

In another embodiment, the flow cell further comprises a fluid inlet which is fluidly connected to the fluid chamber for providing a multiphase sample to the chamber. In embodiments where the fluid chamber is a swirl chamber and/or a chamber with a cylindrical, spherical or conical shape, the fluid inlet can be tangential to the central axis of the swirl chamber. In this way, the fluid arriving into the chamber may already be in motion so as to provide some flow around the chamber. In some embodiments, the inlet may also serve as a fluid outlet. In other embodiments, the flow cell further comprises a fluid outlet.

In a further embodiment, the housing comprises a sealing surface located around the opening of the fluid chamber and is adapted to seal the opening when the device is located against a measurement surface of an analytical device with the opening in fluid communication with the measurement surface. In a further embodiment, the opening of the fluid chamber extends through a part of the housing the housing is adapted to create a seal against an analytical device so as to seal the opening around or on a measurement surface.

In an embodiment, the fluid chamber has a fluid volume of less than 10 mL, for example, 1 mL to 10 mL. Fluid chambers with smaller volumes of 10 mL or less (and particularly 1 mL to 10 mL) have the advantage of giving more reliable readings because they need less new sample to purge/dilute the previous sample. A smaller fluid chamber will require less agitation (e.g. ultrasonic energy) to keep the sample homogenous.

In an embodiment, the flow cell further comprises a further measurement device provided in communication with the inner volume of the fluid chamber. In some embodiments, this is a pH probe, which can be used to measure the pH of a fluid within the fluid chamber. This is particularly beneficial for fluids such as engineering cutting fluids and fruit juices (e.g. orange juice) where the measurement of acidity/alkalinity is important.

In a second aspect, there is provided an assembly for measuring a property of a multiphase fluid sample, the assembly comprising an analytical device comprising a measurement surface for receiving a fluid sample to be measured; and a flow cell connected to the analytical device. The flow cell comprises a housing; a fluid chamber provided in the housing, the fluid chamber comprising sidewalls defining an internal volume for receiving a multiphase fluid sample and an opening; and an agitation device comprising an agitation mechanism adapted to agitate a multiphase fluid sample within the internal volume of the fluid chamber, the agitation mechanism being separated from the internal volume by a barrier wall. The opening of the fluid chamber is located so as to fluidly connect the fluid chamber and the measurement surface. Thus, the flow cell can be arranged with the opening provided over the measurement surface so that the fluid chamber and measurement surface are in fluid communication. The flow cell is adapted such that the agitation device causes movement of the fluid through or within the opening.

In an embodiment, the flow cell provided in the second aspect is a flow cell according to any of the embodiments disclosed herein. In a further embodiment, the analytical device is an optical property measurement device. For example, the analytical device can be a refractometer, a device for measuring turbidity, a spectral measurement device, or a colour measurement device. In a further embodiment, the analytical device is a refractometer and the measurement surface is a prism surface. The measurement surface in some embodiments can be substantially flat. In a further embodiment, the analytical device may be further adapted to measure pH or can be used for titration. Thus, in some embodiments, the analytical device can measure an optical property, such as refractive index, and pH.

In a third aspect, there is provided a method for measuring a property of a multiphase fluid sample, the method comprising: providing an assembly according to the second aspect; providing a multiphase fluid sample to the fluid chamber of the flow cell; agitating the multiphase fluid sample within the fluid chamber to flow the multiphase fluid sample across the measurement surface; and measuring a property of the multiphase fluid sample on the measurement surface.

In an embodiment, the measurement surface is a prism surface of a refractometer and wherein the step of measuring a property of the multiphase fluid sample on the measurement surface comprising measuring the refractive index of the multiphase fluid sample.

In an embodiment, the multiphase fluid is a liquid comprising a further solid, liquid or gas component. In one embodiment, the multiphase fluid sample is selected from the group consisting of a solid-containing liquid (e.g. settling solid particulates (a suspension) or non-settling particulates (colloid)), a mixture of at least two immiscible liquids, or a gas-containing liquid (dissolved and/or undissolved gases). For example, the multiphase fluid can include a carbonated liquid, a coffee-containing liquid or a fruit juice fluid sample. This can include a carbonated liquid, a coffee-containing liquid or a fruit juice fluid sample. The method, assembly and flow cell disclosed herein are particularly effective when used with fruit juices, as these can have a number of components which can settle out or coat surfaces (including particulates and essential oils).

BRIEF DESCRIPTION OF THE DRAWINGS

Specific embodiments will now be discussed in detail with reference to the accompanying drawings, in which.

Like components are given like reference numerals. For example, the flow cell is given reference 110, 210 and 310 herein.

DETAILED DESCRIPTION

Figure 1:
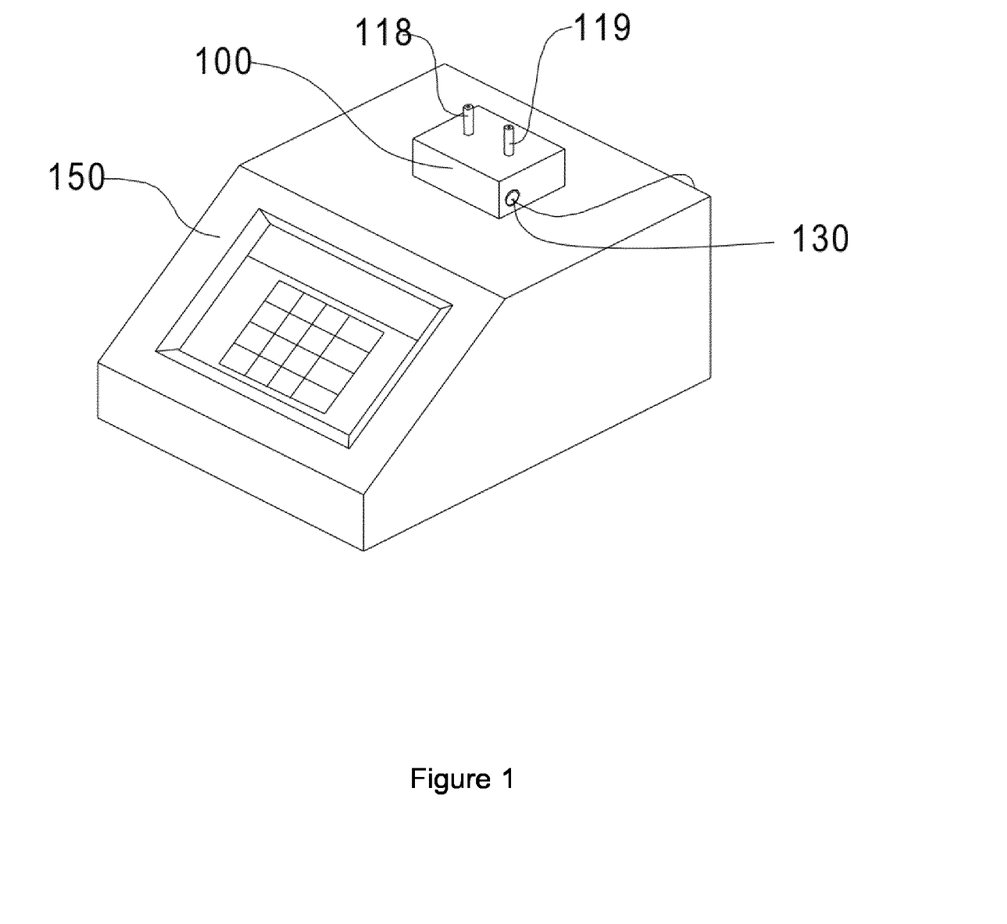
FIG. 1 shows a perspective view of a flow cell and analytical device according to an embodiment.
Figure 2:
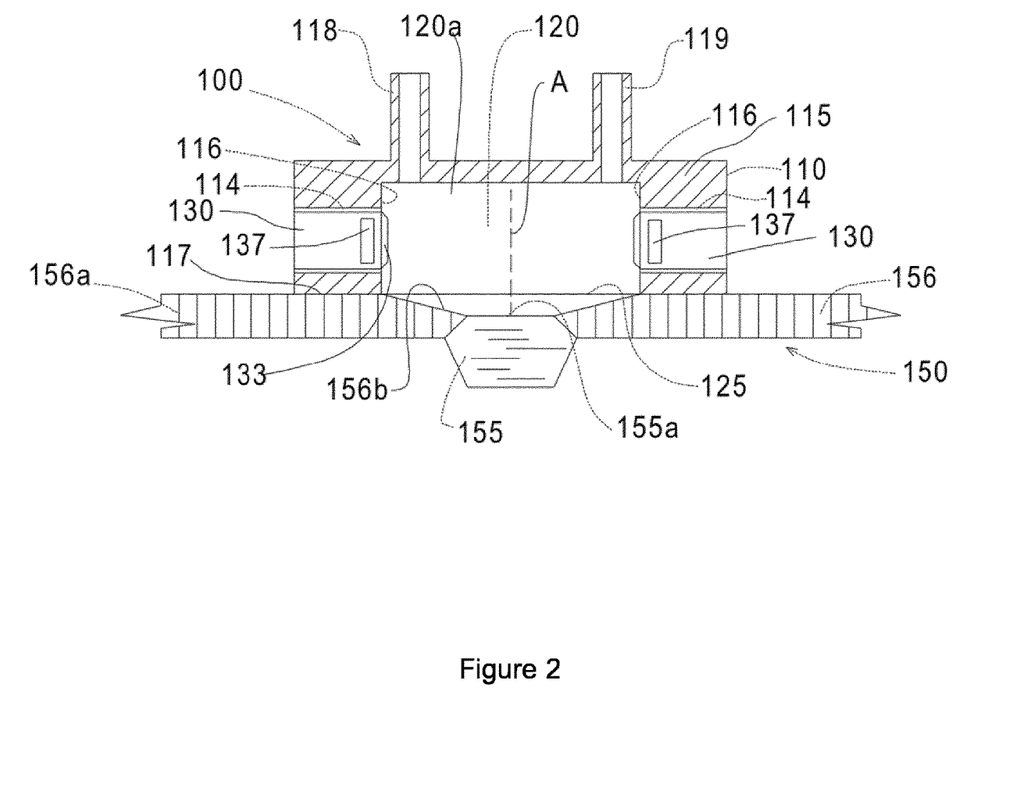
FIG. 2 shows a cross-sectional view of the flow cell and analytical device according to an embodiment.
Figure 3:
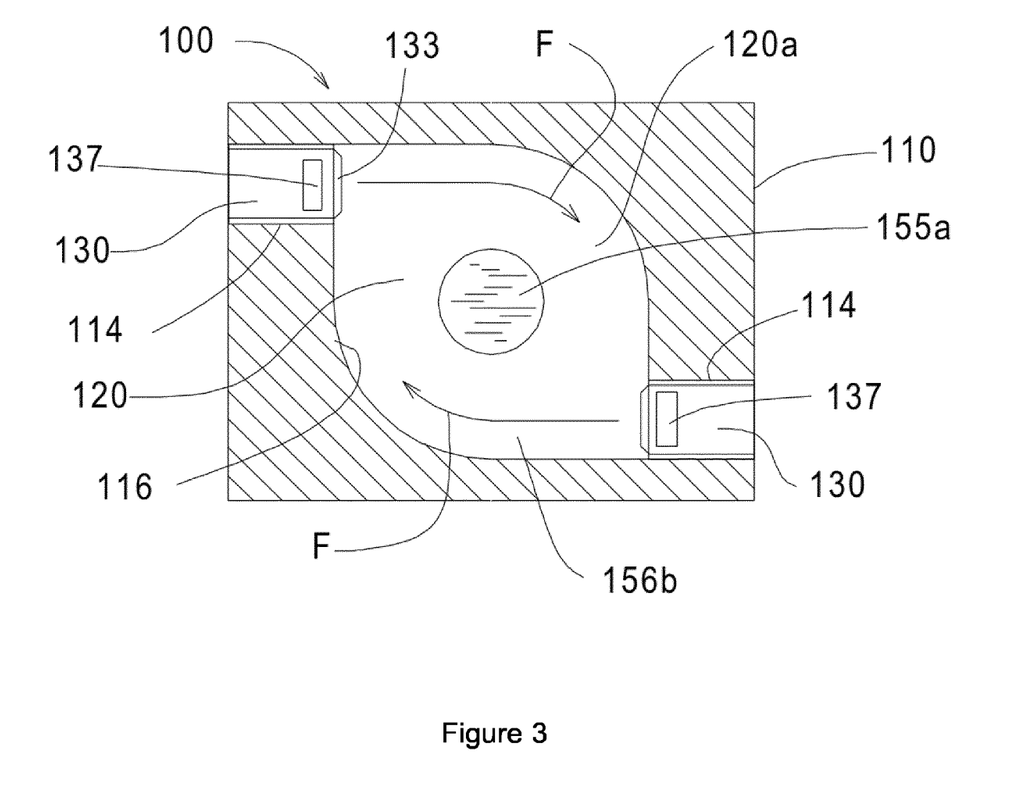
FIG. 3 shows a cross-sectional view of the flow cell and analytical device from a plan perspective according to an embodiment.

FIGS. 1 to 3 show an assembly 100 comprising an analytical device in the form of a refractometer 150 and a flow cell 110 attached to the refractometer 150. The refractometer 150 comprises a housing, which contains a light source and other components for measurement of refractive index (not shown), a prism 155 which defines a flat measurement surface 155*a* onto which a multiphase fluid sample can be received and a prism plate 156 which surrounds the prism 155 so as to expose only the flat measurement surface 155*a*. The prism plate 156 has a flat upper surface 156*a* which is elevated compared to the flat measurement surface 155*a* and an inclined surface 156*b* which extends from the upper surface 156*a* to the measurement surface 155*a* of the prism 155 so as to direct fluid towards the measurement surface 155*a*.

The flow cell 110 comprises a housing 115 which comprises a fluid chamber 120 having sidewalls 116, which sidewalls 116 define an internal volume 120*a* within the fluid chamber 120. The housing also comprises a lower surface 117, which acts as an interface for connecting to the refractometer 150 and corresponds to the shape of the upper surface 156*a* of the prism plate 156 onto which it is received. Thus, the flow cell 110 sits on top of the prism plate upper surface 156 In particular, the lower surface 117 of the housing 115. An attachment mechanism (not shown) is also provided, which secures the flow cell 110 to the refractometer 150 to prevent any relative movement during use. The housing also comprises an inlet 118 and an outlet 119, which extend from the outside of the housing 115 to the fluid chamber 120 thereby allowing fluid to enter the fluid chamber 120.

The fluid chamber 120, which is visible in FIGS. 2 and 3, is a swirl chamber by virtue of its generally cylindrical shape (more accurately it is a chamber with a generally cylindrical shape with a Vesica piscis cross-section—i.e. a vesical piscis prism) and the arrangement of the agitation devices, which will be explained in more detail below. The sidewalls 116 are curved (concave) so as to guide fluid flow around the fluid chamber 120 in a generally circular motion around and over a central axis (A) defined in the longitudinal direction of the cylinder (i.e. through the centre point of each Vesica piscis cross-section)—as indicated by arrows F in FIG. 3. The fluid chamber 120 also comprises an opening 125 located at the bottom of the chamber 120. In this embodiment, the opening 125 extends between the sidewalls 116 of the fluid chamber 120 and thus extends across the entire width of the fluid chamber 120 about the central axis A. Since the flow cell 110 is provided on top of the refractometer 150, the opening 125 thus provides fluid communication between the prism 155 of the refractometer 150 and the fluid chamber 120 of the flow cell 110. Moreover, as the diameter of the opening 125 is greater than the width of the measurement surface 155*a* of the prism 155, the opening 125 is also in communication with the inclined surfaces 156*b* of the prism plate 156. As a result, the prism plate surfaces 156*b* will aid in fluid flow by directing fluid towards the measurement surface 155*a*.

The flow cell 110 also comprises two ultrasonic probes 130 which act as agitation devices for agitating a fluid sample within the internal volume 120*a* of the fluid chamber 120. The ultrasonic probes 130 are each positioned through apertures 114 in the sidewalls 116 of the housing. In this embodiment, the probes 130 are each configured to provide a directional force (i.e. a force that primarily travels in a single direction), as explained in more detail below. In this embodiment, the probes 130 are each arranged on opposite sides of the fluid chamber 120 (as best seen in FIG. 3) and are each arranged to provide a directional force which is tangential to the generally cylindrical structure of the fluid chamber 120 and the central axis A. In this way, with the shape of the fluid chamber 120 and the probes 130 arranged to provide a directional tangential force in the same direction as one another (i.e. clockwise from a plan view), this will cause fluid to flow around the fluid chamber 120 in a substantially circular motion, while also passing over the measurement surface 155*a*. The use of ultrasonic probes 130 also means that there will be additional turbulence and mixing, beyond that caused by the flowing of the fluid, caused by cavitation, where used, the propagation of the sound/pressure waves and the vibration caused by the sound waves thereby further improving the homogeneity or mixing of the fluid, particularly in the regions towards the centre of the device.

Furthermore, in this embodiment, the apertures 114 and the probes 130 are located at the base of the fluid chamber 120 adjacent the opening 125. In this way, the probes 130 are able to agitate fluid within the internal volume 120*a* as well as fluid travelling through the opening 125 and located on the measurement surface 155*a* of the prism 155 tangential and inclined surfaces 156*b* of the prism plate 156. This leads to more efficient flow characteristics and less risk of contamination (e.g. as a result of settling of particulates or separation of immiscible liquids) on the measurement surface 155*a* and prism plate inclined surfaces 156*b*.

Figure 4:
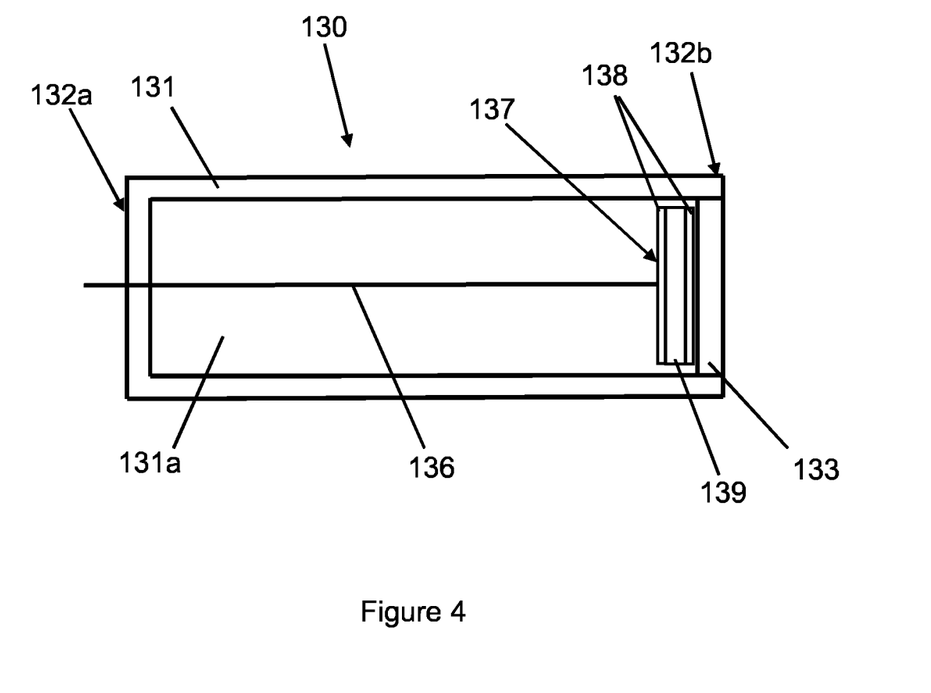
FIG. 4 shows a cross-sectional drawing of an agitation device for use in an embodiment.

The structure of each of the ultrasonic probes 130 is shown in FIG. 4. As can be seen, each probe 130 has an elongate body 131 comprising a sound-insulating material 131*a* and an open forward end or tip 132*b* and an opposite rear end 132*a*. At the open forward end 132*b*, there is provided a cover 133 formed of a glass window, which permits sound to travel therethrough. Towards the forward end 132b of the probe 130, the body 131 houses an agitation mechanism 137 comprised of a piezoelectric plate or plates 139 (i.e. plate(s) formed of a piezoelectric crystal(s)) and two electrodes 138 provided either side of the piezoelectric plate 139. The electrodes 138 are connected to a power source (not shown) by virtue of a wire or cable 136. A control unit (not depicted) controls the actuation of the agitation mechanism 137.

As explained above, the probes 130 each extend through apertures 114 in the sidewalls 116 of the housing 115 of the flow cell 110. More specifically, the probes 130 are arranged so that they extend through the apertures 114 with their forward end or tips 132b facing towards the inner volume of the fluid chamber 120. Moreover, in this embodiment, the probes 130 are arranged so that the cover 133 of the probes 130 is flush or substantially flush with the inner surface of the sidewalls 116 which define the fluid chamber 120. In this way, the cover 133 acts as a barrier wall between the inner volume of the fluid chamber 120 (and any fluid contained within the inner volume) and the agitation mechanism. This barrier wall protects the mechanism from fluid and also reduces the surfaces on which contamination can occur.

In use, the flow cell 110 can receive a multiphase fluid. In some embodiments, this may be a continuous flow of multiphase fluid, with a continuous flow of multiphase fluid out of the outlet 119, or may be a discrete amount of multiphase fluid.

In the case of a discrete sample, the multiphase fluid can be provided to the fluid chamber 120 via the inlet 118. In some embodiments, the inlet 118 and outlet 119 may be sealed after the fluid is provided to the chamber 120. Once received in the chamber, the ultrasonic probes 130 are actuated by the controller so as to agitate the fluid. The directional force applied by the probes 130 results in a pumping action, which acts on the fluid contained within the chamber 120 and causes the fluid to flow. As a result of the shape of the fluid chamber 120 and the tangential arrangement of the probes 130, the pumping action causes a directional flow around the chamber 120 (depicted by arrows F), through the opening 125 and across the measurement surface 155a. This movement of the fluid will help to ensure that the multiphase fluid remains homogenous or well-mixed and reduces the chance of components of the fluid adhering to the surfaces of the fluid chamber 120 and the components of the refractometer. Moreover, the use of ultrasonic probes means that cavitation can also create further, random mixing, which serves to further increase the effect of the mixing of the fluid. This also has a cleaning function, as it will cause components adhering to surfaces to be dislodge.

While the fluid is flowing around the chamber 120 and passing over the measurement surface 155a, the refractometer 150 can be activated so as to measure the properties of the fluid, for example the refractive index of the fluid. As the fluid is homogenous or well-mixed, the measurements taken will be highly accurate and representative of the fluid as a whole. In cases, the power provided to the probes 130 may be adjusted to avoid cavitation during the measurement stage.

Once the measurement is complete, the fluid can be removed from the fluid chamber 120 via the outlet 119. Depending on the properties of the fluid it can be advantageous to maintain agitation as the fluid is removed, to maintain the homogeneity or mixing and reduce the risk of contamination. This may not, however, be necessary for all multiphase fluids, for example, where the movement of the fluid towards and out of the outlet 119 may be sufficient to maintain homogeneity or mixing for the brief period of removal. Removal of the fluid may involve flushing the chamber 120 with a second cleaning fluid, for example water, or may simply involve removing the fluid, for example by the application of a vacuum. Due to the reduced likelihood of contamination, in some embodiments it is possible to remove the fluid by introduction of a new multiphase fluid sample.

Alternatively, a continuous flow of multiphase fluid can be provided into the chamber 120 via the inlet 118 (there may also, therefore, be a continuous flow of fluid out of the outlet 119). When used in such a method, the probes 130 may be continuously actuated and to keep the fluid flowing therethrough. A continuous flow can be useful for testing large volumes of a single type of fluid, for example.

Figure 5:
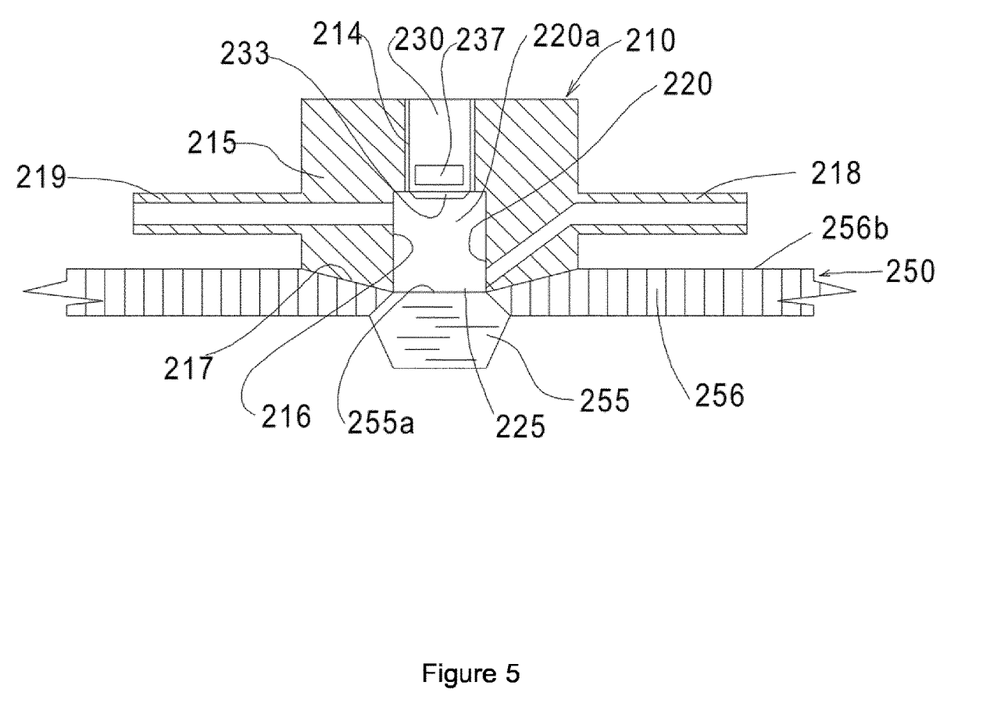
FIG. 5 shows a cross-sectional view of the flow cell and analytical device according to an embodiment.

A second embodiment is depicted in FIG. 5, in which there is a flow cell 210 located on a refractometer 250. The flow cell comprises a housing 215 in which a fluid chamber 220 is located. The fluid chamber 220 comprises sidewalls 216, which are inner surfaces of the housing 215, and an inner volume. The chamber 220 is cylindrical in shape and has an opening 225 located at the lower end face of the cylinder. The flow cell 210 is also provided with an inlet 218 and an outlet 219, which extend through the housing 215 and through the sidewalls 216 to communicate with the fluid chamber 220. In this embodiment, the inlet 218 provides fluid flow to the bottom of the chamber 220 (i.e. adjacent the opening 225) perpendicular to the central axis and outlet 119 is provided at the top of the fluid chamber 220 perpendicular to the central axis of the chamber (i.e. the axis ending through each circular cross-section of the cylinder). In this way, flow of fluid In this embodiment, the inlet 118 and outlet 119 are also located on opposing sides of the cylindrical fluid chamber 220.

The flow cell 210 also comprises an agitation device in the form of an ultrasonic probe 230. The probe 230 has the same structure as the probe 230 and thus includes an agitation mechanism (not visible) and a cover 233 which acts as a barrier wall. In this embodiment, the probe 230 is located at the top of the fluid chamber 220, facing down into the inner volume of the fluid chamber 220. In particular, the probe 230 is located through an aperture 214 provided in the top of the housing 215 which extends through the top wall of the fluid chamber 220 so that the probe 230 can be inserted into a position where it is adjacent the internal volume 220a of the fluid chamber 220. The probe 230 is orientated with the cover 233 forming a continuous wall with the top of the fluid chamber 220 and located between the inner volume of the fluid chamber 220 and the agitation mechanism. By providing a continuous surface, the number of corners and edges which could provide points of collection and dead flow are reduced and thus the risk of contamination is reduced. Further, as with the previous embodiment, the cover 233 thus forms a barrier wall between fluid located in the fluid chamber 220 and the agitation mechanism. In this embodiment, the width of the chamber 220 is similar to the width of the probe 230 and so the probe 230 can act on fluid across the whole width of the chamber 220 thereby promoting effective mixing.

As mentioned above, the flow cell 210 is located on the refractometer 250. The refractometer 250 comprises a prism 255 defining on its upper surface a measurement surface 255a and a prism plate 256 surrounding the prism 255. In this embodiment, the upper surface 256b of the prism plate 256 is in the same plane as the measurement surface 255a such that they define a flat surface. The flow cell 210 is received thereon with the opening 225 located directly over the prism 255, with an interface 217 (in this case, the lower surface of the housing 215) forming a seal with the upper surface 256b of the prism plate 256.

Use of this flow cell 210 is similar to that of the first embodiment, in that multiphase fluid is received through the inlet 218 and into the fluid chamber 220. The probe 230 will agitate the fluid within the chamber 220 so as to cause movement of the fluid and homogenisation or mixing and the optical properties of the fluid can be measured by the refractometer 250. This embodiment is particularly effective when there is a continuous flow of multiphase fluid into the chamber 220.

Figure 6:
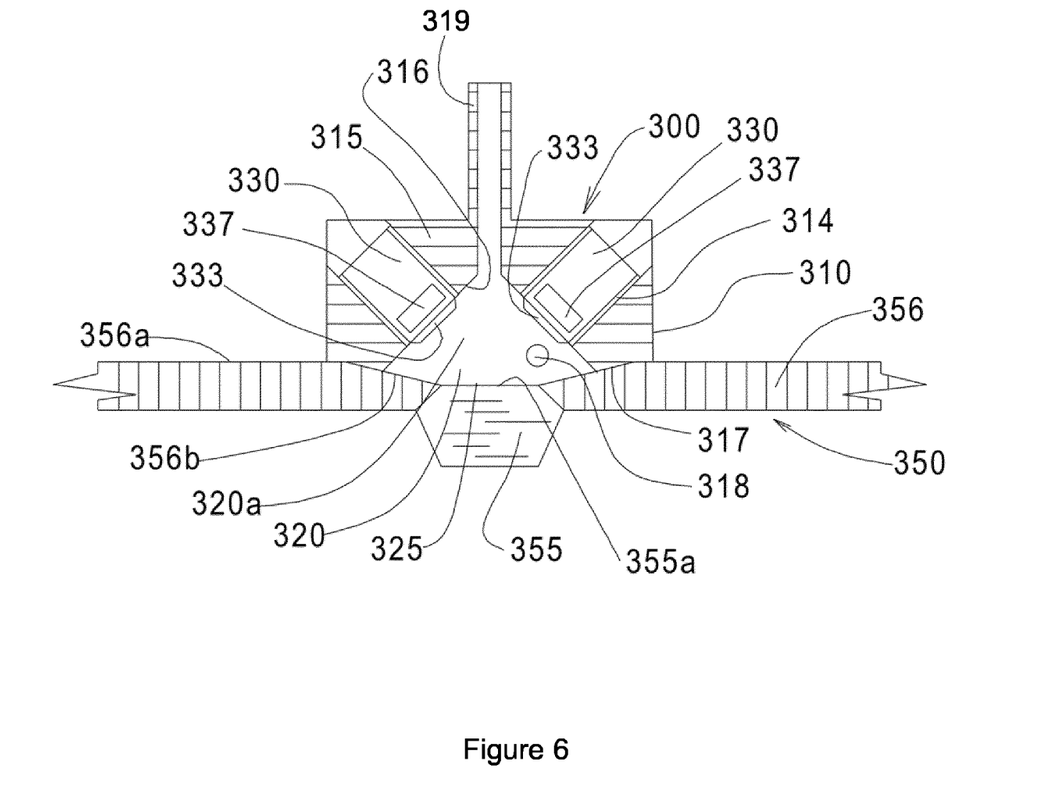
FIG. 6 shows a cross-sectional view of the flow cell and analytical device according to an embodiment.

Another embodiment is shown in FIG. 6 in which there is an assembly 300 comprising a flow cell 310 located on top of a surface of a refractometer 350. The flow cell 310 and refractometer 350 are similar to those of the previous embodiments, for example in that flow cell 310 comprises a housing 315 within which is defined a fluid chamber 320 with sidewalls 316, an internal volume 320a and an opening 325. Probes 330 are also identical to those of FIG. 4 in that they have an agitation mechanism 337 contained within a probe housing. The refractometer 350 is similar in the respect that it comprises a prism 355 defining a measurement surface 355a and a prism plate 356 surrounding the prism 356. The prism plate 356 has a flat upper surface 356a and a sloped surface 356b and is arranged with the slope surface 356b immediately adjacent the measurement surface 355a and sloping towards the measurement surface 355a. However, in this embodiment, the housing 315 of the flow cell 310 is integral with the housing of the refractometer such that these define a single device 300, with the interface being the part of the integral connection.

This embodiment also differs from those of FIGS. 1 to 5 in a number of other ways, including the shape and configuration of the fluid chamber 320 and the interrelated components, such as probes 330. In particular, the chamber 320 of the flow cell 310 has an inverse conical shape (i.e. one in which it has a conical shape, but with the largest diameter being at the base of the chamber 320 and the narrowest diameter being at the top of the chamber 320. The opening 325 is provided at the base of the fluid chamber 320, i.e. at the widest point of the inverse conical shape. The curved walls 316 provide a swirl chamber design, which encourages flowing fluid into a circular motion. Moreover, inlet 318 in this embodiment is provided around mid-height in the fluid chamber 320 and offset from the central axis defined by the conical shape (i.e. tangential), which encourages flow around the fluid chamber as the fluid injected into the chamber will begin to follow the sidewalls 316 around the fluid chamber 320.

In this embodiment, the probes 330 are received within apertures 314 provided in the housing 315, but these apertures 314 do not pass through the sidewalls 316 of the fluid chamber 316; instead, the apertures 314 are external to the fluid chamber 320. Thus, when the probes 330 are received into the apertures 314, the agitation mechanism 337 of each probe 330 is separated from the inner volume of the fluid chamber 320 by the cover 333 and the sidewall 315, which together provide a barrier wall. In this embodiment, the sidewalls 316 of the fluid chamber 320 at the point of the aperture 314 are sufficiently thin such that the agitation mechanism can still agitate fluid within the fluid chamber 320. Moreover, the probes 330 in this embodiment angled relative to the central axis of the conical shape so as to point towards the base of the chamber 320 and the opening 325. Due to the directional nature of the probes 330, this results in more agitation of the fluid adjacent or on the measurement surface, thereby increasing fluid flow and agitation around this region. Moreover, although not visible from the cross-section of FIG. 6, each probe 330 is offset from the central axis (if viewed from a plan view) such that the directional force is substantially tangential thereby further encouraging rotation flow. Another difference in this embodiment is that the outlet 319 is located at the tip of the conical shape (i.e. at the top of the fluid chamber 320). This can be advantageous as the fluid provides a cleaning function for the fluid chamber 320 as can rotates as it is pulled or pushed through the outlet 319.

Although in the above embodiments, the agitation devices 130, 230, 330 are ultrasonic probes, it will be appreciated that other types of agitation devices will be suitable. For example, other sound-based agitation mechanisms can be used to agitate fluid while separated by a barrier wall.

Similarly, although in the above embodiments a refractometer 150, 250, 350 has been used, it will be appreciated that other analytical devices that measure the properties of fluids on a measurement surface can be used. For example, optical analytical devices such as optical devices for turbidity measurements, spectral measurement or colour measurement.

Other variations to the disclosed embodiments can be understood and effected by those skilled in the art, from a study of the drawings, the disclosure, and the appended claims. For example:

The agitation devices used in embodiments may be arranged to continuously agitate the fluid flow or, in other embodiments, the agitation device may provide intermittent agitation, for example in order to disrupt the fluid flow and to cause further turbulence and mixing.

Although the barrier wall is shown as a either a single cover layer at the front of an ultrasonic probe or a cover in combination with a sidewall, it will be appreciated that other configurations of barrier wall may be present. Similarly, the location of the agitation device may not be flush with the sidewalls or top walls and it may extend beyond the sidewalls or the top of the walls of the fluid chamber. In such an embodiment, the cover may contact an inner surface of the sidewalls or top wall and/or may extend over part of the housing of the agitation device, for example. In other embodiments, the cover may enclose more than one side of the agitation mechanism or may completely enclose the agitation mechanism.

What is claimed is:

1. A flow cell for use with an analytical device having a measurement surface onto which a multiphase fluid to be measured can be received, the flow cell comprising:
   a housing comprising an interface for connecting to an analytical device;
   a fluid chamber provided in the housing, the fluid chamber comprising sidewalls at least partly defining an internal volume for receiving a multiphase fluid and an opening arranged so as to provide the multiphase fluid received in the internal volume to a measurement surface of the analytical device when the interface of the housing is connected to the analytical device; and
   an agitation device comprising an ultrasonic sound-wave generator adapted to agitate the multiphase fluid within the internal volume of the fluid chamber and cause movement of the fluid through or within the opening thereby providing fluid to the measurement surface of the analytical device,
   wherein the flow cell further comprises a barrier wall, and wherein the ultrasonic sound-wave generator is separated from the internal volume by the barrier wall; and wherein the fluid chamber is a swirl chamber having a central axis, and wherein the agitation device is adapted to cause the multiphase fluid to flow around the central axis of the swirl chamber.

2. The flow cell of claim 1, wherein the barrier wall is a sidewall of the fluid chamber.

3. The flow cell of claim 1, wherein the agitation device comprises a cover and the barrier wall comprises the cover.

4. The flow cell of claim 1, wherein a sidewall of the fluid chamber comprises an aperture and wherein the agitation device is positioned in or through the aperture.

5. The flow cell of claim 1, wherein the flow cell further comprises a second agitation device comprising a second ultrasonic sound-wave generator and the ultrasonic sound-wave generators of the first and second agitation devices are arranged so as to cause the multiphase fluid to flow around the central axis of the swirl chamber,
wherein the ultrasonic sound-wave generators of the first and second agitation devices are each adapted to provide a directional force on the multiphase fluid so as to cause the multiphase fluid to flow around the central axis of swirl chamber, the directional force being in a direction that is tangential to the swirl chamber.

6. The flow cell of claim 1, wherein the opening of the fluid chamber is located on the central axis of the swirl chamber.

7. The flow cell of claim 1, wherein the fluid chamber has a substantially cylindrical, spherical, conical or vesica piscis prism shape.

8. The flow cell of claim 1, further comprising:
a fluid inlet fluidly connected to the fluid chamber for providing a sample to the chamber.

9. The flow cell of claim 1, wherein the agitation device is adapted to provide a directional force on the multiphase fluid so as to cause the multiphase fluid to flow around the swirl chamber, the directional force being in a direction that is tangential to the central axis of the swirl chamber.

10. The flow cell of claim 1, further comprising:
a sealing surface located around the opening of the fluid chamber and adapted to seal the opening when the device is located against the measurement surface of the analytical device with the opening in fluid communication with the measurement surface.

11. An assembly for measuring a property of a multiphase fluid sample, the assembly comprising:
an analytical device comprising a measurement surface for receiving a fluid to be measured; and
a flow cell connected to the analytical device, the flow cell comprising:
a housing;
a fluid chamber provided in the housing, the fluid chamber comprising sidewalls defining an internal volume for receiving a multiphase fluid and an opening, wherein the fluid chamber is a swirl chamber having a central axis; and
an agitation device comprising an ultrasonic sound-wave generator adapted to agitate the multiphase fluid within the internal volume of the fluid chamber, wherein the flow cell further comprises a barrier wall, and wherein the ultrasonic sound-wave generator is separated from the internal volume by the barrier wall and is adapted to cause the multiphase fluid to flow around the central axis of the swirl chamber,
wherein the opening is located so as to fluidly connect the fluid chamber and the measurement surface and wherein the flow cell is adapted such that the agitation device causes movement of the fluid through or within the opening.

12. The assembly of claim 11, wherein the analytical device is an optical property measurement device, or wherein the analytical device is a refractometer.

13. A method for measuring a property of a multiphase fluid, the method comprising:
providing an assembly that comprises an analytical device comprising a measurement surface for receiving a fluid to be measured, and a flow cell connected to the analytical device, wherein the flow cell comprises a housing, a fluid chamber provided in the housing, the fluid chamber comprising sidewalls defining an internal volume for receiving a multiphase fluid and an opening, wherein the fluid chamber is a swirl chamber having a central axis, and an agitation device comprising an ultrasonic sound-wave generator adapted to agitate the multiphase fluid within the internal volume of the fluid chamber, wherein the flow cell further comprises a barrier wall, and wherein the ultrasonic sound-wave generator is separated from the internal volume by the barrier wall and is adapted to cause the multiphase fluid to flow around the central axis of the swirl chamber, wherein the opening is located so as to fluidly connect the fluid chamber and the measurement surface and wherein the flow cell is adapted such that the agitation device causes movement of the fluid through or within the opening;
providing the multiphase fluid to the fluid chamber of the flow cell;
agitating the multiphase fluid within the fluid chamber to flow the multiphase fluid sample across the measurement surface; and
measuring a property of the multiphase fluid on the measurement surface.

14. The method of claim 13, wherein the measurement surface is a prism surface of a refractometer and wherein measuring the property of the multiphase fluid on the measurement surface comprises measuring the refractive index of the multiphase fluid.

15. The method of claim 14, wherein the multiphase fluid is a solid-containing liquid, a mixture of at least two immiscible liquids, or a gas-containing liquid.

16. The assembly of claim 11, wherein the housing of the flow cell comprises an interface for connecting to the analytical device; and
wherein the opening of the fluid chamber is arranged so as to provide the multiphase fluid received in the internal volume to the measurement surface of the analytical device when the interface of the housing is connected to the analytical device; and
wherein the agitation mechanism is adapted to cause movement of the fluid through or within the opening thereby providing the multiphase fluid to the measurement surface of the analytical device.

* * * * *